US008884565B2

(12) United States Patent
Tezuka et al.

(10) Patent No.: US 8,884,565 B2
(45) Date of Patent: Nov. 11, 2014

(54) MOTOR DRIVING DEVICE COMPRISING MAXIMUM OUTPUT CALCULATION UNIT OF DIRECT CURRENT CONVERSION UNIT

(75) Inventors: Junichi Tezuka, Minamitsuru-gun (JP); Hajime Ogawa, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/467,234

(22) Filed: May 9, 2012

(65) Prior Publication Data

US 2012/0306413 A1  Dec. 6, 2012

(30) Foreign Application Priority Data

Jun. 2, 2011 (JP) ................. 2011-124218

(51) Int. Cl.
*H02P 27/00* (2006.01)
*H02P 5/74* (2006.01)
*H02P 27/06* (2006.01)

(52) U.S. Cl.
CPC . *H02P 5/74* (2013.01); *H02P 27/06* (2013.01)
USPC ..................................................... 318/400.3

(58) Field of Classification Search
None
See application file for complete search history.

(56) References Cited

U.S. PATENT DOCUMENTS

| 7,701,156 | B2* | 4/2010 | Okamura | 318/255 |
| 2006/0290318 | A1* | 12/2006 | Toda et al. | 318/801 |
| 2007/0262738 | A1* | 11/2007 | Kiryu | 318/254 |
| 2009/0079375 | A1* | 3/2009 | Suzuki | 318/434 |
| 2010/0082208 | A1* | 4/2010 | Asai et al. | 701/58 |
| 2011/0273125 | A1* | 11/2011 | Yamada et al. | 318/503 |
| 2012/0238410 | A1* | 9/2012 | Magakat et al. | 482/57 |
| 2012/0306413 | A1* | 12/2012 | Tezuka et al. | 318/400.3 |

FOREIGN PATENT DOCUMENTS

| DE | 43 30 537 B4 | 3/1995 |
| GB | 2 281 825 | 3/1995 |
| JP | 2003-306273 | 10/2003 |
| JP | 2010-74918 | 4/2010 |
| JP | 20100074918 | * 4/2010 |

OTHER PUBLICATIONS

Machine Translation of JP-20100074918.*
Fischer, Rolf: Elektrische Maschinen, Hanser Verlag, München, 2004, pp. 178-183. ISBN 3-446-22693-1.

* cited by examiner

*Primary Examiner* — Shawki S Ismail
*Assistant Examiner* — Zoheb Imtiaz
(74) *Attorney, Agent, or Firm* — Drinker Biddle & Reath LLP

(57) ABSTRACT

A motor driving device comprises: a single DC conversion unit that converts input AC into DC; a plurality of AC conversion units that convert DC output from the DC conversion unit into AC supplied to a plurality of motor units as driving electric power; an electric power consumption calculation unit of the DC conversion unit that calculates electric power consumption of the DC conversion unit from the input voltage and input current to the DC conversion unit every predetermined time period; and a maximum output calculation unit of the DC conversion unit that extracts a maximum value from the electric power consumption of the DC conversion unit calculated every predetermined time period and outputs it as a maximum output of the DC conversion unit.

13 Claims, 9 Drawing Sheets

US 8,884,565 B2

MOTOR DRIVING DEVICE COMPRISING MAXIMUM OUTPUT CALCULATION UNIT OF DIRECT CURRENT CONVERSION UNIT

RELATED APPLICATION DATA

This application claims priority under 35 U.S.C. §119 and/or §365 to Japanese Application No. 2011-124218 filed Jun. 2, 2011, the entire contents of which are incorporated herein by reference.

BACKGROUND OF THE INVENTION

1. Field of the Invention

The present invention relates to a motor driving device that converts AC (alternating current) electric power into DC (direct current) electric power and then converts it into AC electric power again to control motors driven by the AC electric power, and includes a maximum output calculation unit of a DC conversion unit.

2. Description of the Related Art

In a machine tool system, each drive axis of a machine tool is provided with a motor unit and the motor units are driven by a motor driving device. The motor driving device commands and controls positions, velocities or torques of rotation of the motor units for driving axes of the machine tool, wherein the number of motor units is same as the number of the control axles of the machine tool.

The motor driving device includes: a DC conversion unit that converts three-phase commercial AC electric power into DC electric power; and AC convertion units that convert the DC electric power output from the DC conversion unit into AC electric power of a desired frequency supplied as driving electric power of the motor units, and controls position, velocity or torque of the motor unit connected to the corresponding AC conversion unit. The number of the AC conversion units is same as the number of the motor units so that the AC conversion units supplies driving electric power independently to the motor units provided corresponding to a plurality of driving axes in the machine tool. On the other hand, the single DC conversion unit is provided with respect to the plurality of the AC conversion units to reduce cost and space occupation of the motor driving device. Thus, in the motor driving device, the single DC conversion unit supplies the DC electric power to the plurality of the AC conversion units to reduce cost and space occupation in comparison with the case in which a plurality of DC conversion units are provided.

In the motor driving device configured as described above, in order to stably and surely drive the plurality of motor units, sufficient driving electric power has to be supplied to each of the plurality of motor units. To that end, the DC conversion unit has to be selected so that, when the DC conversion unit converts three-phase AC input into DC, its maximum output is larger than the summation of the maximum outputs of the plurality of the motor units. Conventionally, from the value obtained by simply summing the maximum outputs of the plurality of the motor units, the maximum output of the DC conversion unit that converts three-phase AC into DC is determined.

Japanese Unexamined Patent Specification No. 2010-74918 describes an invention in which total electric power consumption of a plurality of AC converting units or regenerated electric power that is regenerated from the AC converting units to a commercial electric power supply is calculated to calculate electric power consumption in a motor driving device.

Depending on operating conditions and circumstances of the machine tool, all of the motor units may not be driven at the maximum output at the same time. In this case, in the motor driving device, all the AC conversion units do not have to output the driving electric power to drive all the motor units at the maximum output. As a result, the DC conversion unit does not have to output the DC electric power larger than the necessary electric power assuming the conditions described above. It is therefore advantageous in view of cost and space occupation to estimate the total electric power actually consumed by all of the motor units and select a DC conversion unit from a plurality of DC conversion units having the maximum output that is at least necessary and that is larger than the estimated total electric power to some extent as an "optimal" DC conversion unit.

However, in order to select the DC conversion unit from a plurality of DC conversion units, a user or designer of a machine tool has to measure input current and input voltage values one by one by using measuring instruments and calculate the electric power consumption values of the motor units individually by using various motor constants when the machine tool actually operates under desired operating conditions and circumstances. Then, in consideration of the calculation results, the user or designer has to estimate the total electric power consumption of the AC conversion units. Thus, it takes a lot of time and effort to select the DC conversion unit from a plurality of DC conversion units. Further, even if the selection of the DC conversion unit is made based on the total electric power consumption of the AC conversion units estimated as described above, the optimal DC conversion unit is not always selected.

Further, in the invention described in Japanese Unexamined Patent Specification No. 2010-74918, the total electric power consumption of the plurality of AC conversion units in the motor driving device and electric power regenerated to the commercial electric power supply are calculated collectively. However, the operating conditions or circumstances under which the individual motor units and AC conversion units may operate are not considered. As a result, even if this invention is used, the optimal DC conversion unit may not be selected.

SUMMARY OF THE INVENTION

In view of the above problems, it is an object of the present invention to provide a motor driving device having: a single DC conversion unit that converts input AC into DC; and a plurality of AC conversion units that convert DC output from the DC conversion unit into AC supplied to motor units as driving electric power, wherein the DC conversion unit that is low in cost and occupies little space can be selected easily.

In order to achieve the above object, in a first aspect of the present invention, there is provided a motor driving device including: a single DC conversion unit that converts input AC into DC; a plurality of AC conversion units that convert DC output from the DC conversion unit into AC supplied to a plurality of motor units as driving electric power; an electric power consumption calculation unit of the DC conversion unit that calculates electric power consumption of the DC conversion unit from input voltage and input current to the DC conversion unit every predetermined time period; and a maximum output calculation unit of the DC conversion unit that extracts a maximum value from the electric power consumption of the DC conversion unit calculated every the predetermined time period and outputs it as a maximum output of the DC conversion unit.

Further, in a second aspect of the present invention, there is provided a motor driving device including: a single DC conversion unit that converts input AC into DC; a plurality of AC conversion units that convert DC output from the DC conversion unit into AC supplied to the plurality of motor units as driving electric power; an electric power consumption calculation unit of the motor units that calculates electric power consumption of the motor units from voltage and current supplied to the motor units every predetermined time period; and a maximum output calculation unit of the DC conversion unit that calculates total electric power consumption of the motor units that is a summation of the electric power consumption values of all the motor units every the predetermined time period and extracts a maximum value from the total electric power consumption of the motor units calculated every the predetermined time period and outputs it as a maximum output of the DC conversion unit.

Further, in a third aspect of the present invention, there is provided a motor driving device including: a single DC conversion unit that converts input AC into DC; a plurality of AC conversion units that convert DC output from the DC conversion unit into AC supplied to the plurality of motor units as driving electric power; an electric power consumption calculation unit of the motor units that calculates electric power consumption of the motor units from voltage and current supplied to the motor units every predetermined time period; and a maximum output calculation unit of the DC conversion unit that calculates total electric power consumption of the motor units every predetermined time period and extracts a maximum value from the total electric power consumption of the all motor units calculated every the predetermined time period and outputs it as a maximum output of the DC conversion unit, wherein the total electric power consumption of the motor units is calculated by summing only fractions of the electric power consumption of the motor units actually flowing into the motor units.

Further, in a fourth aspect of the present invention, there is provided a motor driving device including: a single DC conversion unit that converts input AC into DC; a plurality of AC conversion units that convert DC output from the DC conversion unit into AC supplied to the plurality of motor units as driving electric power; an electric power consumption calculation unit of the DC conversion unit that calculates electric power consumption of the DC conversion unit from input voltage and input current to the DC conversion unit every predetermined time period; an electric power consumption calculation unit of the motor units that calculates electric power consumption of the motor units from the voltage and current supplied to the motor units every the predetermined time period mentioned above; and a maximum output calculation unit of the DC conversion unit that calculates a value that is obtained by adding an absolute value of a fraction of the electric power consumption of the motor units flowing out from the motor units to the electric power consumption of the DC conversion unit every predetermined time period and extracts a maximum value from the values calculated every the predetermined time period mentioned above and outputs it as a maximum output of the DC conversion unit.

Further, in the motor driving device according to the first and fourth aspects, the electric power consumption calculation unit of the DC conversion unit may calculate the electric power consumption of the DC conversion unit by calculating an inner product of values for the input voltage and the input current of the DC conversion unit in a vector space.

Further, in the motor driving device according to the second, third and fourth aspects, the electric power consumption calculation unit of the motor units may calculate the electric power consumption of the motor units by calculating, for each motor unit, an inner product of values for the voltage and current supplied to the motor units in a vector space.

Further, in the motor driving device according to the second, third and fourth aspects, the electric power consumption calculation unit of the motor units may calculate the electric power consumption of the motor units by summing, for each motor unit, a value that is obtained by multiplying detected velocity and torque of the motor unit and a value that is obtained by multiplying a square of the input current value supplied to the motor unit and an internal resistance value of the motor unit.

Further, in the motor driving device according to the first and fourth aspects, the electric power consumption calculation unit of the DC conversion unit may correct the calculated electric power consumption of the DC conversion unit by using correction parameters and output it.

Further, in the motor driving device according to the second, third and fourth aspects, the electric power consumption calculation unit of the motor units may correct the calculated electric power consumption of the motor units by using correction parameters and output it.

Further, in the motor driving device according to any of the aspects described above, the maximum output calculation unit of the DC conversion unit may correct the calculated maximum output of the DC conversion unit by using correction parameters and output it.

Further, the motor driving device according to any of the aspects described above may further include a display unit that displays computation results or desired data that is being computed by the electric power consumption calculation unit of the DC conversion unit, the maximum output calculation unit of the DC conversion unit or the electric power consumption calculation unit of the motor unit.

BRIEF DESCRIPTION OF THE DRAWINGS

The present invention will be better understood by referring to the accompanying drawings, wherein.

DETAILED DESCRIPTION

Figure 1:
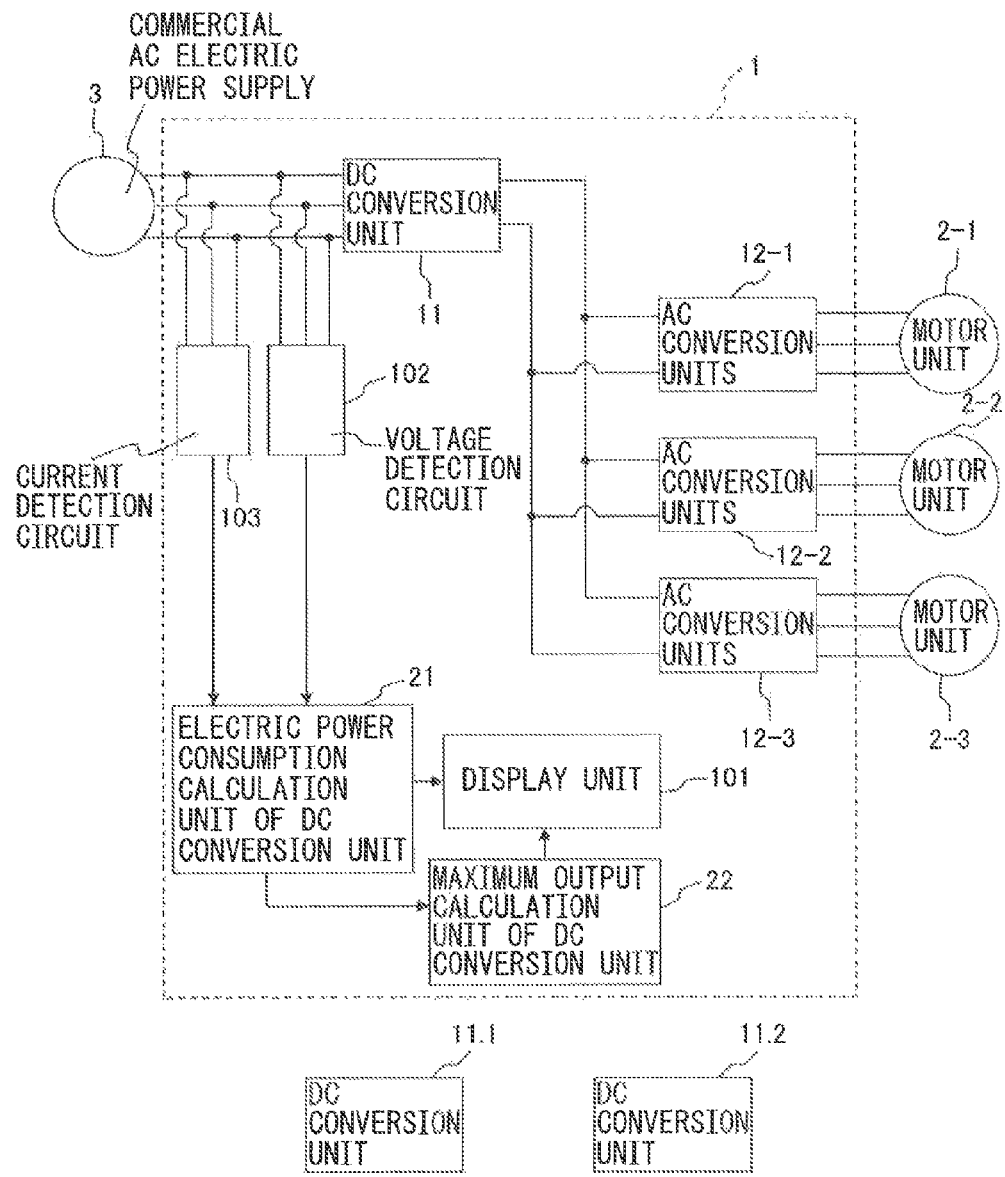
FIG. 1 is a block diagram illustrating a motor driving device according to a first embodiment of the present invention.

Hereinafter, with reference to the accompanying drawings, a motor driving device including a maximum output calculation unit of a DC current conversion unit will be described. It is to be understood, however, that the present invention is not limited to the accompanying drawings or the embodiments described below.

A motor driving device according to first to fourth embodiments of the present invention described below is connected with motor units of the number same as the number of control axes for driving a feed axis and a main spindle of a machine tool. In these embodiments, the number of control axes of the machine tool and, thus, the number of motor units is three. However, this is merely an example and this is not a limitation on the present invention. Hereinafter, throughout the several views, like reference numerals designate like elements.

FIG. 1 is a block diagram illustrating a motor driving device according to a first embodiment of the present invention. In the illustrated example, the number of control axes of the machine tool is three and, therefore, three motor units 2-1, 2-2 and 2-3 are provided.

According to the first embodiment of the present invention, a motor driving device 1 having: a single DC conversion unit 11 that converts input AC into DC; and a plurality of AC conversion units 12-1, 12-2 and 12-3 that convert DC input from DC conversion unit 11 into AC supplied to motor units 2-1, 2-2 and 2-3, respectively, as driving electric power, includes: an electric power consumption calculation unit 21 of the DC conversion unit that calculates electric power consumption of the DC conversion unit from the input voltage and input current to DC conversion unit 11 every predetermined time period; and a maximum output calculation unit 22 of the DC conversion unit that extracts a maximum value from the electric power consumption calculated every the predetermined time period and outputs it as a maximum output of the DC conversion unit.

Electric power consumption calculation unit 21 of the DC conversion unit and maximum output calculation unit 22 of the DC conversion unit are comprised of a processor for performing computations on input data. The processor may be implemented by, for example, a microcomputer, a general-purpose computer and the like. Alternatively, the function of electric power consumption calculation unit 21 of the DC conversion unit and maximum output calculation unit 22 of the DC conversion unit may be performed by a CPU of a control unit (not illustrated) that generates command values for positions, velocities or torques of motors or an integrated control unit (not illustrated) that controls the entire operation of the motor driving device in an integrated manner.

Further, it is preferable that motor driving device 1 according to the first embodiment of the present invention further includes a display unit 101 that displays computation results or desired data that is being computed by electric power consumption calculation unit 21 of the DC conversion unit and maximum output calculation unit 22 of the DC conversion unit. Display unit 101 may be a well-known display device.

A current detection circuit 103 detects an input current input from a three-phase commercial AC power supply 3 to DC conversion unit 11. The detected value of the input current to DC conversion unit 11 is input to electric power consumption calculation unit 21 of the DC conversion unit.

A voltage detection circuit 102 detects an input voltage applied on the input of DC conversion unit 11 by three-phase commercial AC power supply 3. The detected value of the input voltage to DC conversion unit 11 is input to electric power consumption calculation unit 21 of the DC conversion unit.

Figure 2:
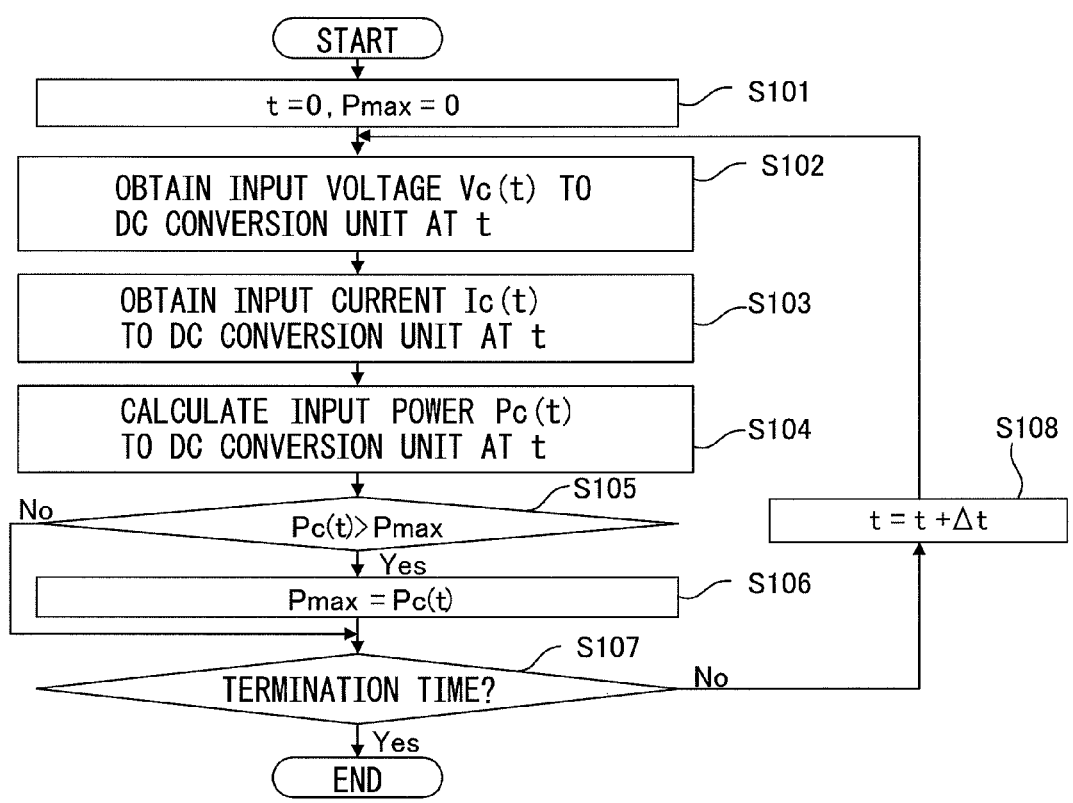
FIG. 2 is a flow chart illustrating an operational flow of a motor driving device according to a first embodiment of the present invention.

FIG. 2 is a flow chart illustrating an operational flow of a motor driving device according to a first embodiment of the present invention.

In step S101, motor driving device 1 is initialized. Specifically, the timer value in motor driving device 1 is set to zero (0) as an initial value and the maximum value Pmax of the electric power consumption of the DC conversion unit is set to zero (0) as an initial value. The maximum value Pmax is stored in a predetermined memory of maximum output calculation unit 22 of the DC conversion unit or motor driving device 1 in which maximum output calculation unit 22 is provided.

While motor units 2-1, 2-2 and 2-3 are driven by motor driving device 1 under desired operating conditions or circumstances, the processes in steps S102-S108 described below are performed.

In step S102, voltage detection circuit 102 obtains an input voltage value Vc (t) to DC conversion unit 11 at a time t. The obtained input voltage value Vc(t) is input to electric power consumption calculation unit 21 of the DC conversion unit. The input voltage value Vc(t) is obtained at predetermined sampling intervals as described below.

In step S103, current detection circuit 103 obtains an input current value Ic(t) to DC conversion unit 11 at a time t. The obtained input current value Ic(t) is input to electric power consumption calculation unit 21 of the DC conversion unit. The input current value Ic(t) is obtained at predetermined sampling intervals as described below.

In FIG. 2, the obtainment of the input voltage value Vc(t) by voltage detection circuit 102 in step S102 and the obtainment of the input current value Ic(t) by current detection circuit 103 in step S103 are described sequentially. But, in fact, the input voltage value Vc(t) and the input current value Ic(t) should be obtained at the same time t.

In step 104, electric power consumption calculation unit 21 of the DC conversion unit calculates the value of electric power consumption Pc(t) of the DC conversion unit from the input voltage value Vc(t) and the input current value Ic(t) at the time t.

In step 104, electric power consumption calculation unit 21 of the DC conversion unit calculates an electric power consumption Pc(t) by, for example, calculating an inner product of values for the input voltage value Vc(t) and the input current value Ic(t) in a vector space.

In DC conversion unit 11, assuming that a vector of the three-phase AC input voltage value Vc(t) is $\vec{V}_{abc}$ and a vector of the three-phase AC input current value Ic(t) is $\vec{I}_{abc}$, following equations hold:

$$\vec{V}_{abc} = \begin{bmatrix} V_a \\ V_b \\ V_c \end{bmatrix}, \vec{I}_{abc} = \begin{bmatrix} I_a \\ I_b \\ I_c \end{bmatrix}$$

At this time, using the inner product, the electric power consumption Pc(t) of the DC conversion unit is calculated according to the equation (1):

$$Pc(t) = \vec{V}_{abc} \cdot \vec{I}_{abc} \quad (1)$$

In step S105 in FIG. 2, maximum output calculation unit 22 of the DC conversion unit determines whether the electric power consumption value Pc(t) of the DC conversion unit calculated in step S104 is larger than the maximum value Pmax that is already stored in the memory or not. If the electric power consumption value Pc(t) of the DC conversion unit is larger than the maximum value Pmax, the process proceeds to step S106. In contrast, if the electric power consumption value Pc(t) of the DC conversion unit is smaller than the maximum value Pmax, the process proceeds to step S107.

In step S106, maximum output calculation unit 22 of the DC conversion unit replaces the maximum value Pmax already stored in the memory by the electric power consumption value Pc(t) of the DC conversion unit calculated in step S104.

In step S107, it is determined whether the timer in motor driving device 1 indicates the termination time or not. If not, the process proceeds to step S108. If the timer indicates the termination time, the process terminates.

In step S108, the timer in motor driving device 1 increments by Δt. Here, Δt corresponds to the sampling interval of voltage detection circuit 102 and current detection circuit 103 described above. After that, the process returns to step S102.

The operations in steps S102 to S108 described above are repeated until the timer in motor driving device 1 indicates the termination time. As a result, maximum output calculation unit 22 of the DC conversion unit extracts the eventual maximum value from the electric power consumption of the DC conversion unit calculated by electric power consumption calculation unit 21 of the DC conversion unit. In this embodiment, this eventual maximum value is determined as the maximum output Pmax of the DC conversion unit. Thus, electric power consumption calculation unit 21 of the DC conversion unit calculates the time-series data of the electric power consumption Pc(t) of DC conversion unit at times t and, then, maximum output calculation unit 22 of the DC conversion unit extracts the eventual maximum value from the time-series data and determines it as the maximum output Pmax of the DC conversion unit. Further, in the first embodiment of the present invention, the detected input voltage and current value to DC conversion unit 11, the electric power consumption of DC conversion unit calculated by electric power consumption calculation unit 21 of the DC conversion unit, and the maximum output Pmax of the DC conversion unit calculated by maximum output calculation unit 22 of the DC conversion unit may be multiplied by or added to predetermined correction parameters, so as to obtain the maximum output of the DC conversion unit larger than the actual value. In this way, stability of the electric power supply in the DC conversion unit can be improved.

The time-series data of the electric power consumption Pc(t) of the DC conversion unit calculated by electric power consumption calculation unit 21 of the DC conversion unit and the maximum output Pmax of the DC conversion unit determined by maximum output calculation unit 22 of the DC conversion unit are displayed by display unit 101. The user or designer of the machine tool system can therefore view the data displayed on display unit 101, so that the maximum output corresponding to the electric power consumption that may occur when the machine tool system is used can be grasped more accurately and easily and, as a consequence, the DC conversion unit that has the determined maximum output can be selected easily from a plurality of DC conversion units 11.1, 11.2. Display unit 101 may further display the input voltage value Vc(t) obtained by voltage detection circuit 102 and the input current value Ic(t) obtained by current detection circuit 103.

Figure 3:
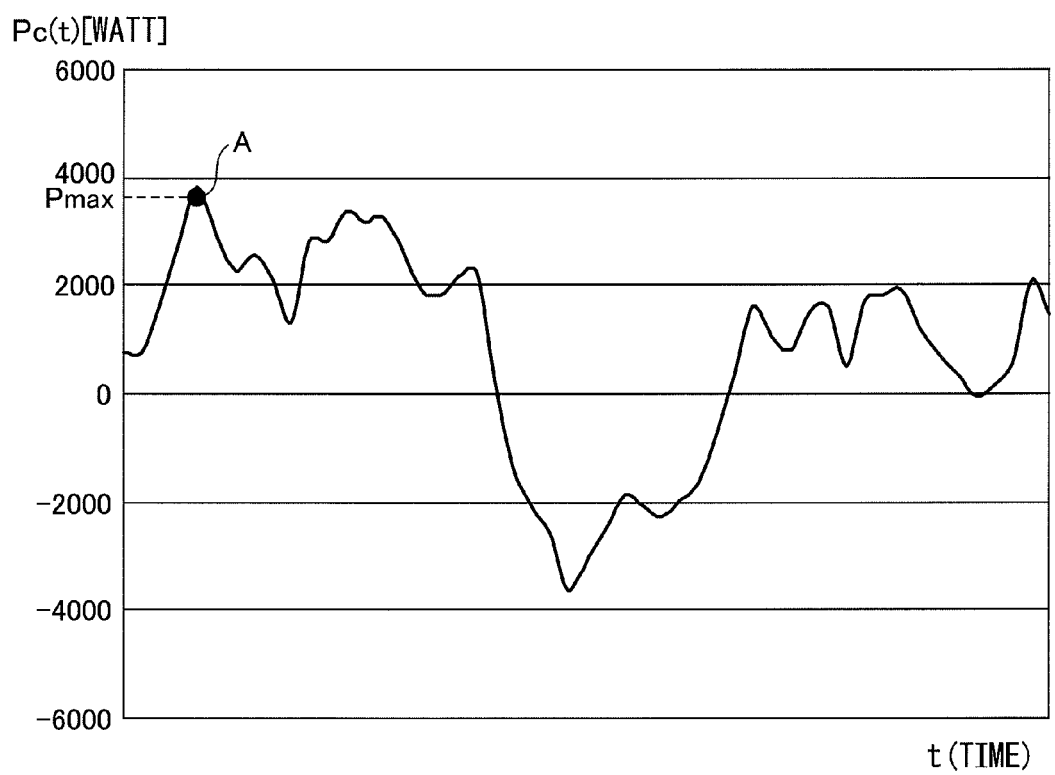
FIG. 3 is a diagram illustrating electric power consumption and its maximum value of a DC conversion unit when a motor driving device according to a first embodiment of the present invention operates.

FIG. 3 is a diagram illustrating electric power consumption and its maximum value of a DC conversion unit when a motor driving device according to a first embodiment of the present invention operates. Though it is merely an example, FIG. 3 illustrates the time-series data of the electric power consumption Pc(t) of the DC conversion unit calculated by electric power consumption calculation unit 21 of the DC conversion unit that reaches the maximum value Pmax at point A. The user or designer of the machine tool system may select (or design) the DC conversion unit that has the maximum output corresponding to this maximum value Pmax.

Figure 4:
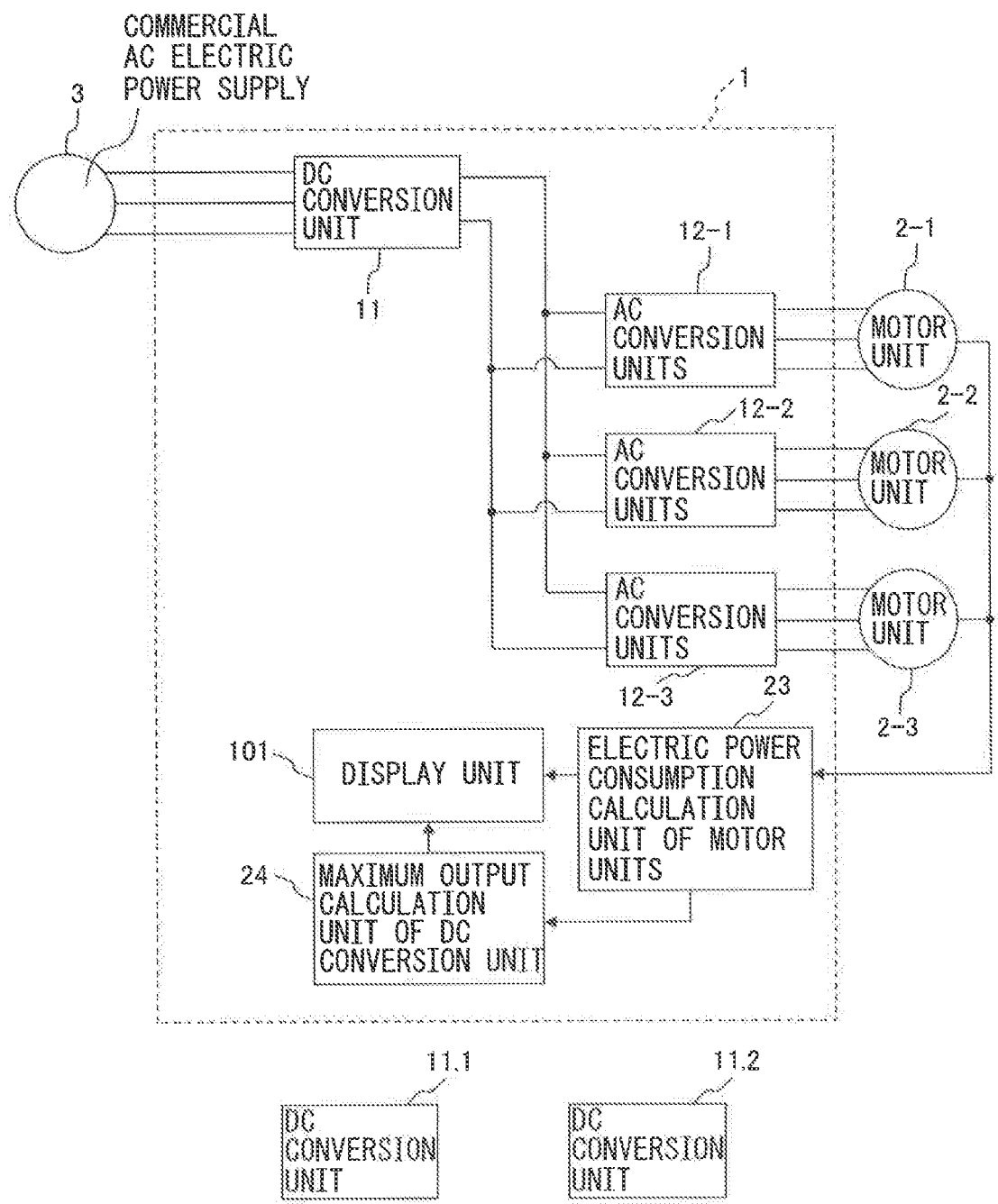
FIG. 4 is a block diagram illustrating a motor driving device according to a second embodiment of the present invention.

FIG. 4 is a block diagram illustrating a motor driving device according to a second embodiment of the present invention. In the illustrated example, the number of control axes of the machine tool is three and, therefore, three motor units 2-1, 2-2 and 2-3 are provided.

According to the second embodiment of the present invention, a motor driving device 1 having: a single DC conversion unit 11 that converts input AC into DC; and a plurality of AC conversion units 12-1, 12-2 and 12-3 that convert DC input from DC conversion unit 11 into AC supplied to motor units 2-1, 2-2 and 2-3, respectively, as driving electric power, includes: an electric power consumption calculation unit 23 of the motor units that calculates electric power consumption of motor units 2-1, 2-2 and 2-3 from voltage and current supplied to motor units 2-1, 2-2 and 2-3 every predetermined time period; and a maximum output calculation unit 24 of the DC conversion unit that calculates total electric power consumption of all motor units 2-1, 2-2 and 2-3 every the predetermined time period mentioned above and extracts the maximum value from the total electric power consumption of the all motor units and outputs it as the maximum output of the DC conversion unit.

Electric power consumption calculation unit 23 of the motor units and maximum output calculation unit 24 of the DC conversion unit are comprised of a processor for performing computations on input data. The processor may be implemented by, for example, a microcomputer, a general-purpose computer and the like. Alternatively, the function of electric power consumption calculation unit 23 of the motor units and maximum output calculation unit 24 of the DC conversion unit may be performed by a CPU of a control unit (not illustrated) that generates command values for positions, velocities or torques of motors or an integrated control unit (not illustrated) that controls the entire operation of the motor driving device in an integrated manner.

Further, it is preferable that motor driving device 1 according to the second embodiment of the present invention further includes a display unit 101 that displays computation results or desired data that is being computed by electric power consumption calculation unit 23 of the motor units and maximum output calculation unit 24 of the DC conversion unit. Display unit 101 may be a well-known display device.

In motor driving device 1 according to the second embodiment of the present invention, the voltage and current supplied to motor units 2-1, 2-2 and 2-3 are detected by well-known voltage and current detection circuits, though the voltage and current detection circuits are not illustrated in FIG. 4 for the sake of simplicity. The detected voltage and current values supplied to motor units 2-1, 2-2 and 2-3 are input to electric power consumption calculation unit 23 of the motor units.

Figure 5:
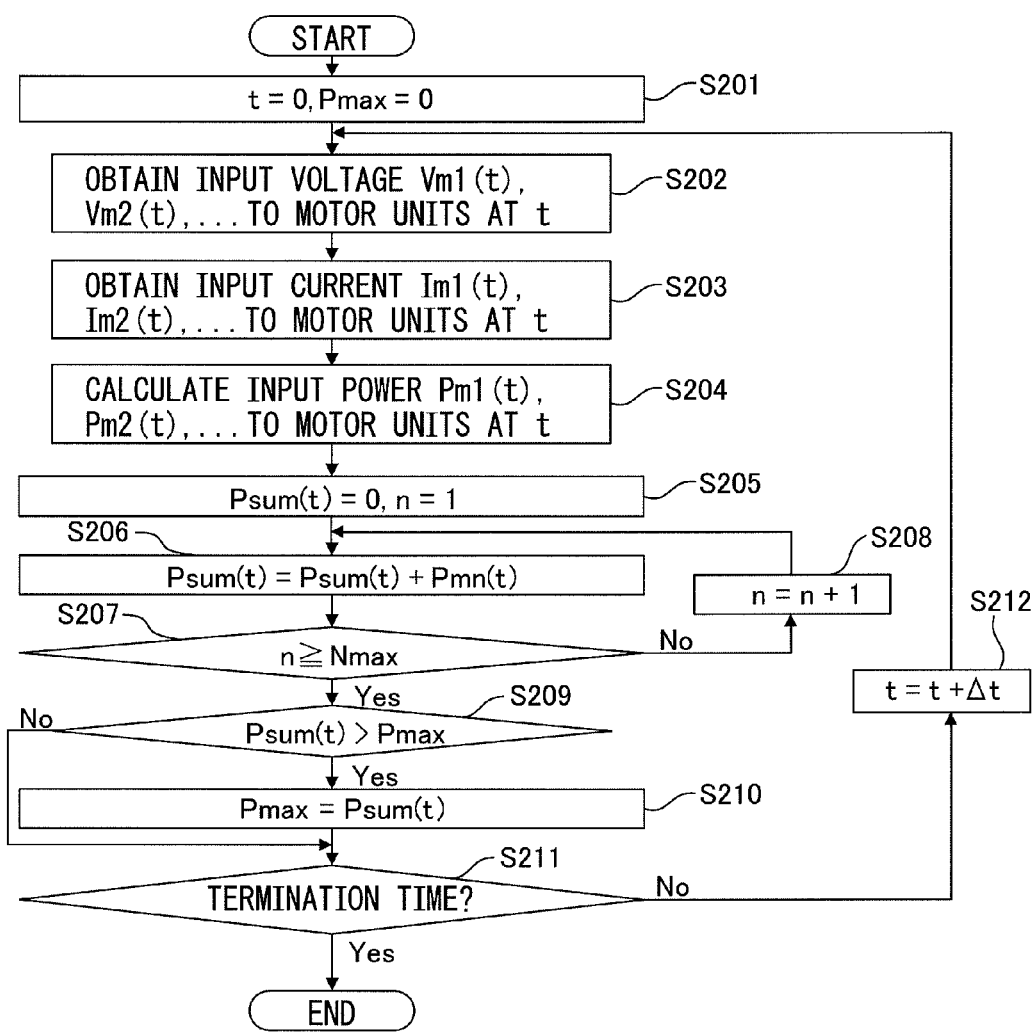
FIG. 5 is a flow chart illustrating an operational flow of a motor driving device according to a second embodiment of the present invention.

FIG. 5 is a flow chart illustrating an operational flow of a motor driving device according to a second embodiment of the present invention.

In step S201, motor driving device 1 is initialized. Specifically, the timer value in motor driving device 1 is set to zero (0) and the maximum value Pmax that is a calculation result by maximum output calculation unit 24 of the DC conversion unit is set to zero (0). The maximum value Pmax is stored in a predetermined memory of maximum output calculation unit 24 of the DC conversion unit or motor driving device 1 in which maximum output calculation unit 24 is provided.

While motor units 2-1, 2-2 and 2-3 are driven by motor driving device 1 under desired operating conditions or circumstances, the processes in steps S202-S212 described below are performed.

In step S202, input voltage values Vm1(t), Vm2(t), ..., VmNmax(t) to motor units 2-1, 2-2 and 2-3 at a time t are obtained. Here, Nmax represents the number of motor units and, in the illustrated example, Nmax=3. The obtained input voltage values Vm1(t), Vm2(t), ..., VmNmax(t) are input to electric power consumption calculation unit 23 of the motor units. The obtained input voltage values Vm1(t), Vm2(t), ..., VmNmax(t) are obtained at predetermined sampling intervals as described below.

In step S203, input current values Im1(t), Im2(t), ..., ImNmax(t) to motor units 2-1, 2-2 and 2-3 at a time t are obtained. The obtained input current values Im1(t), Im2(t), ..., ImNmax(t) are input to electric power consumption calculation unit 23 of the motor units. The input current values Im1(t), Im2(t), ..., ImNmax(t) are obtained at predetermined sampling intervals as described below.

In FIG. 5, the obtainment of the input voltage values Vm1(t), Vm2(t), ..., VmNmax(t) in step S202 and the obtainment of the input current values Im1(t), Im2(t), ..., ImNmax(t) in step S203 are described sequentially. But, in fact, the input voltage values Vm1(t), Vm2(t), ..., VmNmax(t) and the input current values Im1(t), Im2(t), ..., ImNmax(t) should be obtained at the same time t.

In step S204, electric power consumption calculation unit 23 of the motor units calculates the electric power consumption Pc(t) of the DC conversion unit from the input voltage value Vc(t) and the input current value Ic(t) at the time t.

In step S204, for example, similarly to the calculation of the inner product by electric power consumption calculation unit 21 of the DC conversion unit in step S104 in the first embodiment described above, electric power consumption calculation unit 23 of the motor units calculates the electric power consumption of motor units Pm1(t), Pm2(t), ..., PmNmax(t) by calculating, for each motor unit 2-1, 2-2 and 2-3, an inner product of values for the input voltage Vm1(t), Vm2(t), ..., VmNmax(t) and the input current Im1(t), Im2(t), ..., ImNmax(t) input to motor unit 2-1, 2-2 and 2-3 in a vector space as illustrated in equation (2).

In the motor unit, assuming that an input voltage vector is $\vec{V}$ and an input current vector is $\vec{I}$, the electric power consumption P(W) is calculated by equation (2):

$$P = \vec{V} \cdot \vec{I} \quad (2)$$

Alternatively, in step S204, electric power consumption calculation unit 23 of the motor units may calculate the electric power consumption of motor units Pm1(t), Pm2(t), ..., PmNmax(t) by summing, for each motor unit, a value that is obtained by multiplying the detected velocity and torque of motor unit 2-1, 2-2 and 2-3 and a value that is obtained by multiplying a square of the input current value Im1(t), Im2(t), ..., IMNmax(t) supplied to motor unit 2-1, 2-2 or 2-3 and an internal resistance value of motor unit 2-1, 2-2 or 2-3. Specifically, in the motor unit, assuming that the velocity is v (rad/sec), the torque is T (Nm), the internal resistance is R (Ω) and the input current supplied to the motor unit is I (A), the electric power consumption Pm(W) of the motor unit is expressed by equation (3):

$$P = V \cdot T + I \cdot R^2 \quad (3)$$

In step S205 in FIG. 5, as an initial setting, maximum output calculation unit 24 of the DC conversion unit sets a summation Psum(t) of motor units 2-1, 2-2 and 2-3 to zero (0) and sets an identification number n of the motor unit to 1. This operation may be performed before step S202 described above. For example, it may be performed at the same time as step S201. The summation Psum(t) is stored in a predetermined memory of maximum output calculation unit 24 of the DC conversion unit or motor driving device 1 in which maximum output calculation unit 24 is provided.

In steps S206-S208, maximum output calculation unit 24 of the DC conversion unit calculates the summation of the electric power consumption Pm1(t), Pm2(t), ..., PmNmax(t) of the motor units. Thus, in step S207, it is determined whether the identification number n of the motor unit is equal to or larger than Nmax (3 in this embodiment) or not. If the identification number n of the motor unit is smaller than Nmax, in step S208, n is incremented by 1 and, then, in step S206, the electric power consumption Pmn(t) of the motor unit having the identification number n is added to the summation Psum(t) stored in the memory and the result is stored in the memory as a new summation Psum(t). On the other hand, if the identification number n of the motor unit is equal to or larger than Nmax, the process proceeds to step S209.

In step S209, maximum output calculation unit 24 of the DC conversion unit determines whether the summation Psum(t) of the electric power consumption of the motor units calculated in step S206 is larger than the maximum value Pmax already stored in the memory or not. If the summation Psum(t) of the electric power consumption of the motor units is larger than the maximum value Pmax, the process proceeds to step S210 and, if the summation Psum(t) of the electric power consumption of the motor units is smaller than the maximum value Pmax, the process proceeds to step S211.

In step S210, maximum output calculation unit 24 of the DC conversion unit replaces the maximum value Pmax already stored in the memory by the summation Psum(t) of the electric power consumption of the motor units calculated in step S206.

In step S211, it is determined whether the timer in motor driving device 1 indicates the termination time or not. If not, the process proceeds to step S212. If the time indicates the termination time, the process terminates.

In step S212, the timer in motor driving device 1 increments by Δt. Here, Δt corresponds to the sampling interval of the detection of the input voltage and current to the motor units described above. After that, the process returns to step S202.

The operations in steps S202 to S212 described above are repeated until the timer in motor driving device 1 indicates the termination time. As a result, maximum output calculation unit 24 of the DC conversion unit extracts the eventual maximum value Psum(t) from the total electric power consumption of the motor units. In this embodiment, this eventual maximum value is determined as the maximum output Pmax of the DC conversion unit. Thus, electric power consumption calculation unit 23 of the motor units calculates the time-series data of the electric power consumption of motor units Pm1($t$), Pm2($t$), . . . , PmNmax(t) at times t and, then, maximum output calculation unit 24 of the DC conversion unit extracts the eventual maximum value from the time-series data and determines it as the maximum output Pmax of the DC conversion unit. Further, in the second embodiment of the present invention, the input voltage and current to motor units 2-1, 2-2 and 2-3, the electric power consumption of the motor unit calculated by electric power consumption calculation unit 23 of the motor units, and the maximum output Pmax of the DC conversion unit calculated by maximum output calculation unit 24 of the DC conversion unit may be multiplied by or added to predetermined correction parameters, so as to obtain the maximum output of the DC conversion unit larger than the actual value. In this way, stability of the electric power supply in the DC conversion unit can be improved.

The time-series data of the electric power consumption values Pm1($t$), Pm2($t$), . . . , PmNmax(t) of the motor units calculated by electric power consumption calculation unit 23 of the motor units, the time-series data of the total electric power consumption Psum(t) of the motor units that is the summation of the electric power consumption values of the motor units, and the maximum output Pmax of the DC conversion unit determined by maximum output calculation unit 24 of the DC conversion unit are displayed by display unit 101. The user or designer of the machine tool system can therefore view the data displayed on display unit 101, so that the maximum output corresponding to the electric power consumption that may occur when the machine tool system is used can be grasped more accurately and easily and, as a consequence, the DC conversion unit that has the determined maximum output can be selected easily from a plurality of DC conversion units 11.1, 11.2. Display unit 101 may further display the input current values Im1($t$), Im2($t$), . . . , ImNmax(t) to motor units 2-1, 2-2 and 2-3, and the input voltage values Vm1($t$), Vm2($t$), . . . , VmNmax(t) to motor units 2-1, 2-2 and 2-3.

Figure 6:
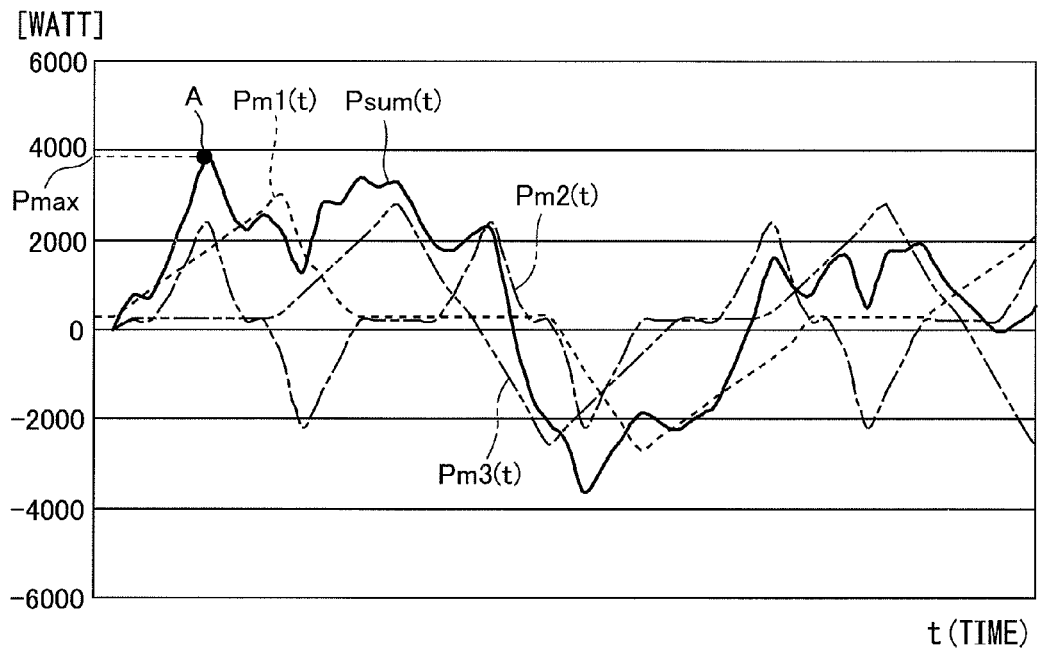
FIG. 6 is a diagram illustrating electric power consumption of motor units and its summation when a motor driving device according to a second embodiment of the present invention operates.

FIG. 6 is a diagram illustrating electric power consumption of motor units and its summation when a motor driving device according to a second embodiment of the present invention operates. Though it is merely an example, FIG. 6 illustrates the time-series data of the electric power consumption values Pm1($t$), Pm2($t$) and Pm3($t$) calculated by electric power consumption calculation unit 23 of the motor units and the total electric power consumption value Psum(t) of the motor units. The total electric power consumption value Psum(t) of the motor units reaches the maximum value at point A. The user or designer of the machine tool system may select (or design) the DC conversion unit that has the maximum output corresponding to this maximum value Pmax.

In the second embodiment described above, electric power consumption calculation unit 23 of the motor units calculates the summation Psum(t) by simply summing the electric power consumption values Pm1($t$), Pm2($t$), . . . , PmNmax(t) of the motor units. The summation Psum(t) therefore includes a fraction of the electric power regenerated from motor units 2-1, 2-2 and 2-3 to commercial power supply 3. For example, in the graph in FIG. 6, the electric power consumption values Pm1($t$), Pm2($t$), . . . , Pm3($t$) of motor units in the negative side (or, in other words, the electric power values less than 0 watt) correspond to the regenerated electric power flowing out from motor units 2-1, 2-2 and 2-3 to commercial power supply 3.

In contrast to this, in motor driving device 1 according to a third embodiment of the present invention described below, the regenerated power described above is not included in the maximum output of the DC conversion unit when the maximum output is determined. The block diagram of motor driving device 1 according to the third embodiment of the present invention is similar to the block diagram of FIG. 4, which illustrates motor driving device 1 according to the second embodiment described above.

According to the third embodiment of the present invention, a motor driving device 1 having: a single DC conversion unit 11 that converts input AC into DC; and a plurality of AC conversion units 12-1, 12-2 and 12-3 that convert DC input from DC conversion unit 11 into AC supplied to motor units 2-1, 2-2 and 2-3, respectively, as driving electric power, includes: electric power consumption calculation unit 23 of the motor units that calculates electric power consumption of motor units 2-1, 2-2 and 2-3 from voltage and current supplied to motor units 2-1, 2-2 and 2-3 every predetermined time period; and maximum output calculation unit 24 of the DC conversion unit that calculates total electric power consumption of the motor units every predetermined time period and extracts a maximum value from the total electric power consumption of all the motor units and outputs it as the maximum output of the DC conversion unit, wherein the total electric power consumption of the motor units is calculated by summing only fractions of the electric power consumption of the motor units actually flowing into motor units 2-1, 2-2 and 2-3.

Thus, except that maximum output calculation unit 24 of the DC conversion unit calculates the total electric power consumption of the motor units by summing only fractions of the electric power consumption of the motor units actually flowing into the motor units 2-1, 2-2 and 2-3 every the predetermined time period mentioned above, the third embodiment of the present invention is similar to the second embodiment described above and a description of the similar elements is omitted.

Figure 7:
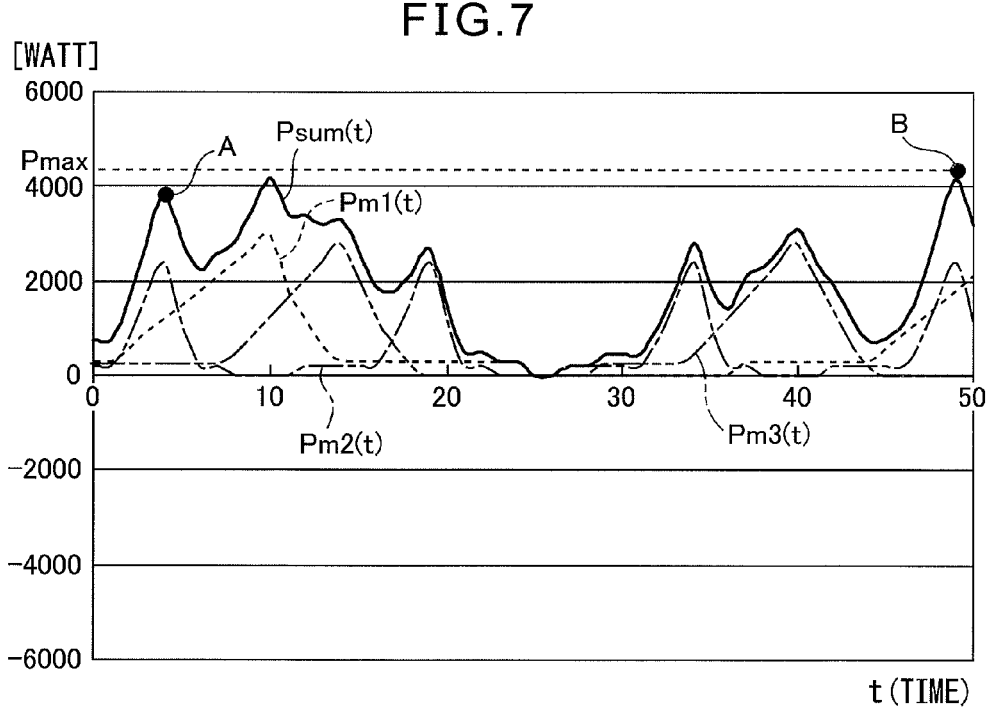
FIG. 7 is a diagram illustrating electric power consumption of motor units and its maximum value when a motor driving device according to a third embodiment of the present invention operates.

FIG. 7 is a diagram illustrating electric power consumption of motor units and its maximum value when a motor driving device according to a third embodiment of the present invention operates. FIG. 7 illustrates waveforms Pm1($t$), Pm2($t$) and Pm3($t$) in which the regenerated electric power values flowing out from motor units 2-1, 2-2 and 2-3 to commercial power supply 3 (or, in other words, the electric power values less than 0 watt) are deleted from the electric power consumption values of the motor units illustrated in FIG. 6. The total electric power consumption Psum(t) of the motor units is calculated by summing only fractions of the electric power consumption of the motor units actually flowing into motor units 2-1, 2-2 and 2-3 every predetermined time period mentioned above. The regenerated electric power is therefore not included. Further, for example, around point A, the total electric power consumption of the motor units is calculated by summing only the electric power values Pm1($t$), Pm2($t$) and Pm3($t$) flowing into motor units 2-1, 2-2 and 2-3 and, therefore, it represents the waveform data same as that illustrated in FIG. 6. However, for example, around time B, motor unit 2-3 operates in a regenerating manner (FIG. 6) and, therefore, the electric power consumption of motor unit 2-3 exhibits a negative value (or, in other words, a value less than 0 watt). As a result, according to the calculation by maximum output calculation unit 24 of the DC conversion unit, Psum(t) exhibits the maximum value around point B and differs from the result in FIG. 6. The user or designer of the machine tool system may select (or design) the DC conversion unit that has the maximum output corresponding to this maximum value Pmax.

Figure 8:
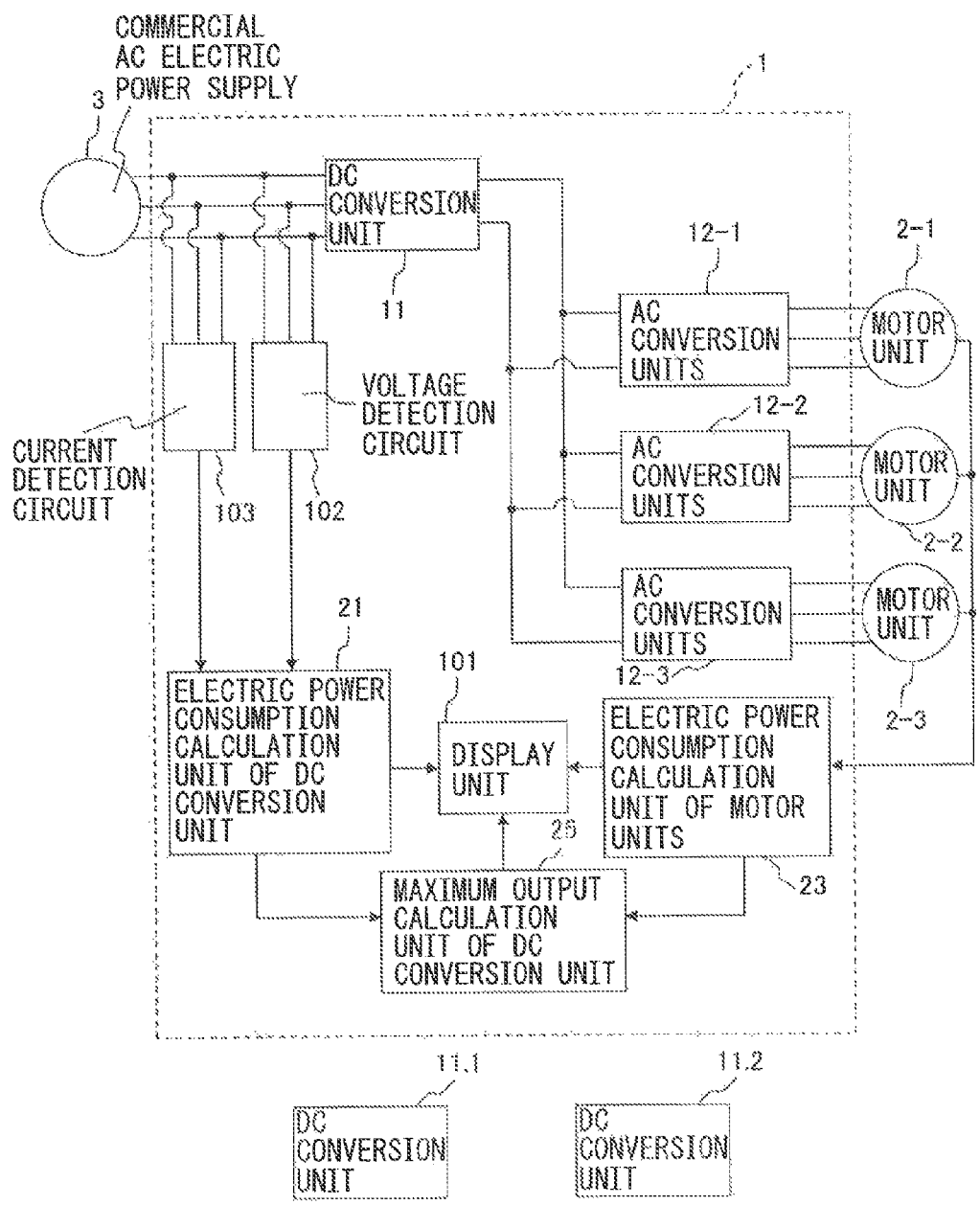
FIG. 8 is a block diagram illustrating a motor driving device according to a fourth embodiment of the present invention.

FIG. 8 is a block diagram illustrating a motor driving device according to a fourth embodiment of the present invention. In the illustrated example, the number of control axes of the machine tool is three and, therefore, three motor units 2-1, 2-2 and 2-3 are provided.

According to the fourth embodiment of the present invention, motor driving device 1 having: a single DC conversion unit 11 that converts input AC into DC; and a plurality of AC conversion units 12-1, 12-2 and 12-3 that convert DC input from DC conversion unit 11 into AC supplied to motor units 2-1, 2-2 and 2-3, respectively, as driving electric power, includes: electric power consumption calculation unit 21 of the DC conversion unit that calculates electric power consumption of the DC conversion unit from the input voltage and input current to the DC conversion unit 11 every predetermined time period; electric power consumption calculation unit 23 of the motor units that calculates electric power consumption of motor units 2-1, 2-2 and 2-3 from voltage and current supplied to motor units 2-1, 2-2 and 2-3 every the predetermined time period mentioned above; and maximum output calculation unit 25 of the DC conversion unit that calculates a value that is obtained by adding an absolute value of a fraction of the electric power consumption of the motor units flowing out from motor units 2-1, 2-2 and 2-3 to the electric power consumption of the DC conversion unit every predetermined time period and extracts the maximum value from the values calculated every the predetermined time period mentioned above and outputs it as the maximum output of the DC conversion unit.

Electric power consumption calculation unit 21 of the DC conversion unit, electric power consumption calculation unit 23 of the motor units, and maximum output calculation unit 25 of the DC conversion unit are comprised of a processor for performing computations on input data. The processor may be implemented by, for example, a microcomputer, a general-purpose computer and the like. Alternatively, the function of electric power consumption calculation unit 21 of the DC conversion unit, electric power consumption calculation unit 23 of the motor units, and maximum output calculation unit 25 of the DC conversion unit may be performed by a CPU of a control unit (not illustrated) that generates command values for positions, velocities or torques of motors or an integrated control unit (not illustrated) that controls the entire operation of the motor driving device in an integrated manner.

Further, it is preferable that motor driving device 1 according to the fourth embodiment of the present invention further includes a display unit 101 that displays computation results or desired data that is being computed by electric power consumption calculation unit 21 of the DC conversion unit, electric power consumption calculation unit 23 of the motor units, and maximum output calculation unit 25 of the DC conversion unit. Display unit 101 may be a well-known display device.

A voltage detection circuit 102 detects an input voltage applied on the input of DC conversion unit 11 by three-phase commercial AC power supply 3. The detected value of the input voltage to DC conversion unit 11 is input to electric power consumption calculation unit 21 of the DC conversion unit.

A current detection circuit 103 detects an input current input from three-phase commercial AC power supply 3 to DC conversion unit 11. The detected value of the input current to DC conversion unit 11 is input to electric power consumption calculation unit 21 of the DC conversion unit.

In motor driving device 1 according to the fourth embodiment of the present invention, similarly to the second embodiment described above, the voltage and current supplied to motor units 2-1, 2-2 and 2-3 are detected by well-known voltage and current detection circuits, though the voltage and current detection circuits are not illustrated in FIG. 8 for the sake of simplicity. The detected voltage and current values supplied to motor units 2-1, 2-2 and 2-3 are input to electric power consumption calculation unit 23 of the motor units.

Figure 9:
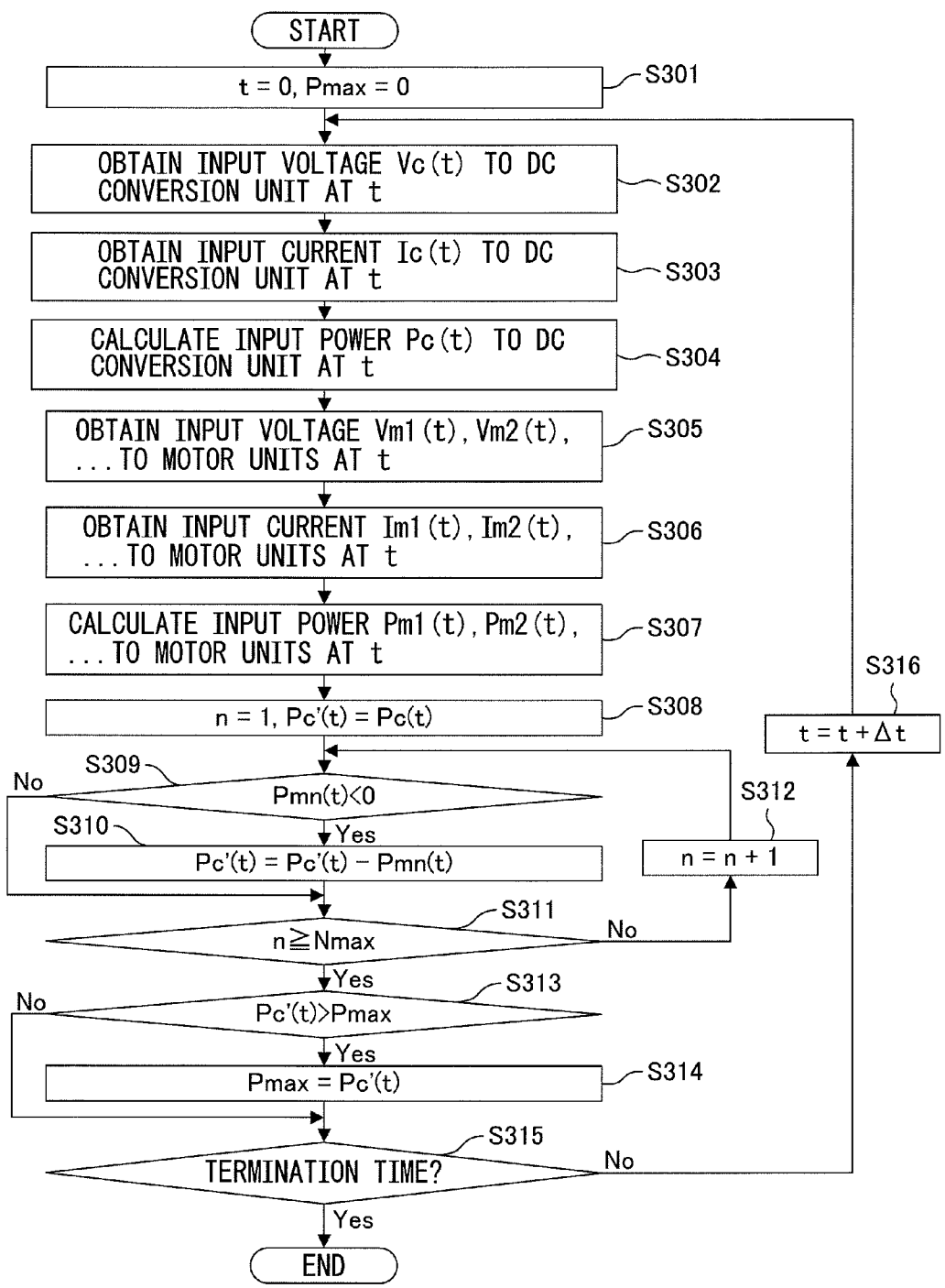
FIG. 9 is a flow chart illustrating an operational flow of a motor driving device according to a fourth embodiment of the present invention.

FIG. 9 is a flow chart illustrating an operational flow of a motor driving device according to a fourth embodiment of the present invention.

In step S301, motor driving device 1 is initialized. Specifically, the timer value in motor driving device 1 is set to zero (0) as an initial value and the maximum value Pmax of the electric power consumption of the DC conversion unit is set to zero (0) as an initial value. The maximum value Pmax is stored in a predetermined memory of maximum output calculation unit 25 of the DC conversion unit or motor driving device 1 in which maximum output calculation unit 25 of the DC conversion unit is provided.

While motor units 2-1, 2-2 and 2-3 are driven by motor driving device 1 under desired operating conditions or circumstances, the processes in steps S302-S316 described below are performed.

In step S302, voltage detection circuit 102 obtains an input voltage value Vc(t) to DC conversion unit 11 at a time t. The obtained input voltage value Vc(t) is input to electric power consumption calculation unit 21 of the DC conversion unit. The input voltage value Vc(t) is obtained at predetermined sampling intervals as described below.

In step S303, current detection circuit 103 obtains an input current value Ic(t) to DC conversion unit 11 at a time t. The obtained input current value Ic(t) is input to electric power consumption calculation unit 21 of the DC conversion unit. The input current value Ic(t) is obtained at predetermined sampling intervals as described below.

In FIG. 9, the obtainment of the input voltage value Vc(t) by voltage detection circuit 102 in step S302 and the obtainment of the input current value Ic(t) by current detection circuit 103 in step S303 are described sequentially. However, in fact, the input voltage value Vc(t) and the input current value Ic(t) should be obtained at the same time t.

In step 304, electric power consumption calculation unit 21 of the DC conversion unit calculates the value of electric power consumption Pc(t) of the DC conversion unit from the input voltage value Vc(t) and the input current value Ic(t) at the time t.

In step 304, as in the first embodiment described above, electric power consumption calculation unit 21 of the DC conversion unit calculates an electric power consumption Pc(t) by, for example, calculating an inner product of values for the input voltage value Vc(t) and the input current value Ic(t) in a vector space. In this case, specifically, the equation (1) described with respect to the first embodiment described above is applied.

In step S305, input voltage values $Vm1(t)$, $Vm2(t)$, ..., $VmNmax(t)$ to motor units 2-1, 2-2 and 2-3 at a time t are obtained. Here, Nmax represents the number of motor units and, in the illustrated example, Nmax is "3". The obtained input voltage values $Vm1(t)$, $Vm2(t)$, ..., $VmNmax(t)$ are input to electric power consumption calculation unit 23 of the motor units. The obtained input voltage values $Vm1(t)$, $Vm2(t)$, ..., $VmNmax(t)$ are obtained at predetermined sampling intervals as described below.

In step S306, input current values $Im1(t)$, $Im2(t)$, ..., $ImNmax(t)$ to motor units 2-1, 2-2 and 2-3 at a time t are obtained. The obtained input current values Im1(t), Im2(t), . . . , ImNmax(t) are input to electric power consumption calculation unit 23 of the motor units. The input current values Im1(t), Im2(t), . . . , ImNmax(t) are obtained at predetermined sampling intervals as described below.

In FIG. 9, the obtainment of the input voltage values Vm1(t), Vm2(t), . . . , VmNmax(t) in step S305 and the obtainment of the input current values Im1(t), Im2(t), . . . , ImNmax(t) in step S306 are described sequentially. However, in fact, the input voltage values Vm1(t), Vm2(t), . . . , VmNmax(t) and the input current values Im1(t), Im2(t), . . . , ImNmax(t) should be obtained at the same time t.

In step S307, electric power consumption calculation unit 23 of the motor units calculates the electric power consumption Pm1(t), Pm2(t), . . . , PmNmax(t) of the motor units from the input voltage value Vm1(t), Vm2(t), . . . , VmNmax(t) and the input current value Im1(t), Im2(t), . . . , ImNmax(t) at the time t (Nmax is "3" in the illustrated example).

In step S307, for example, similarly to the calculation of the inner product by electric power consumption calculation unit 23 of the motor units in the second embodiment described above, electric power consumption calculation unit 23 of the motor units calculates the electric power consumption of motor units Pm1(t), Pm2(t), . . . , PmNmax(t) by applying the equation (2) to calculate, for each motor unit 2-1, 2-2 and 2-3, an inner product of values for the input voltage Vm1(t), Vm2(t), . . . , VmNmax(t) and the input current Im1(t), Im2(t), . . . , ImNmax(t) input to motor unit 2-1, 2-2 and 2-3 in a vector space. Alternatively, electric power consumption calculation unit 23 of the motor units may calculate the electric power consumption of motor units Pm1(t), Pm2(t), . . . , PmNmax(t) by summing, for each motor unit, a value that is obtained by multiplying the detected velocity and torque of motor units 2-1, 2-2 and 2-3 and a value that is obtained by multiplying a square of the input current value Im1(t), Im2(t), . . . , IMNmax(t) supplied to motor units 2-1, 2-2 or 2-3 and an internal resistance value of motor units 2-1, 2-2 or 2-3.

In step S308, as an initial setting, maximum output calculation unit 25 of the DC conversion unit sets the electric power consumption value Pc'(t) of the DC conversion unit as the electric power consumption value Pc(t) and sets an identification number n of the motor unit to 1. The electric power consumption value Pc'(t) of the DC conversion unit will be described in detail below. The electric power consumption value Pc'(t) is stored in a predetermined memory of maximum output calculation unit 25 of the DC conversion unit or motor driving device 1 in which maximum output calculation unit 25 of the DC conversion unit is provided.

In steps S308-S312, maximum output calculation unit 25 of the DC conversion unit calculates the electric power consumption value Pc'(t) of the DC conversion unit. The electric power consumption value Pc'(t) of the DC conversion unit is obtained by adding an absolute value of a fraction of the electric power consumption of the motor units flowing out from motor units 2-1, 2-2 and 2-3 to the electric power consumption Pc'(t) of the DC conversion unit every the predetermined time period mentioned above. Specifically, this value is calculated as follows. Thus, in step S309, maximum output calculation unit 25 of the DC conversion unit determines whether the electric power consumption Pmn(t) of the motor unit having the identification number n (where n=1, 2, . . . , Nmax) is negative (or, in other words, less than 0 watt) or not. If the electric power consumption of the motor unit is negative, the process proceeds to step S310 and, if it is positive, the process proceeds to step S311. In step S310, the electric power consumption Pmn(t) of the motor units is subtracted from the electric power consumption value Pc'(t) of the DC conversion unit stored in the memory and the obtained value is stored as a new electric power consumption value Pc'(t) in the memory. In step S311, it is determined whether the identification number n of the motor unit is larger than Nmax (3 in this embodiment) or not. If the identification number n of the motor unit is smaller than Nmax, in step S312, n is incremented by 1 and the process returns to step S309. If the identification number n of the motor unit is equal to or larger than Nmax, the process proceeds to step S313.

In step S313, maximum output calculation unit 25 of the DC conversion unit determines whether the electric power consumption value Pc'(t) of the DC conversion unit calculated in steps S309-S312 is larger than the maximum value Pmax already stored in the memory or not. If the electric power consumption value Pc'(t) is larger than the maximum value Pmax, the process proceeds to step S314 and, if the electric power consumption value Pc'(t) of the DC conversion unit is smaller than the maximum value Pmax, the process proceeds to step S315.

In step S314, maximum output calculation unit 25 of the DC conversion unit replaces the maximum value Pmax already stored in the memory by the electric power consumption value Pc'(t) of the DC conversion unit calculated in steps S309-S312.

In step S315, it is determined whether the timer in motor driving device 1 indicates the termination time or not. If not, the process proceeds to step S316. If the time indicates the termination time, the process terminates.

In step S316, the timer in motor driving device 1 increments by Δt. Here, Δt corresponds to the sampling interval of the detection of the input voltage and current values to the motor units described above. After that, the process returns to step S302.

The operations in steps S302 to S316 described above are repeated until the timer in motor driving device 1 indicates the termination time. As a result, maximum output calculation unit 25 of the DC conversion unit extracts the eventual maximum value from the electric power consumption values Pc'(t) of the DC conversion unit. In this embodiment, this eventual maximum value is determined as the maximum output Pmax of the DC conversion unit. Thus, electric power consumption calculation unit 25 of the DC conversion unit obtains the electric power consumption value Pc'(t) by adding an absolute value of a fraction of the electric power consumption of the motor units flowing out from motor units 2-1, 2-2 and 2-3 to the electric power consumption of the DC conversion unit every the predetermined time period mentioned above and, then, extracts a maximum value from time-series data of the electric power consumption value Pc'(t) and determines it as a maximum output Pmax of the DC conversion unit. Further, in the fourth embodiment of the present invention, the input voltage and current to DC conversion unit 11, or the input voltage and current to motor units 2-1, 2-2 and 2-3 or both of them may be multiplied by or added to predetermined correction parameters, so as to obtain a maximum output of the DC conversion unit larger than the actual value. In this way, stability of the electric power supply in the DC conversion unit can be improved.

The time-series data of the electric power consumption value Pc(t) calculated by electric power consumption calculation unit 21 of the DC conversion unit, the time-series data of the electric power consumption values Pm1(t), Pm2(t), . . . , PmNmax(t) of the motor units calculated by electric power consumption calculation unit 23 of the motor units, the time-series data of the total electric power consumption Psum(t) of the motor units that is a summation of the electric power consumption values of the motor units, the time-series data of the electric power consumption Pc'(t) of the DC conversion unit calculated by electric power consumption calculation unit 25 of the DC conversion unit, and the maximum output Pmax of the DC conversion unit determined by maximum output calculation unit 25 of the DC conversion unit are displayed by display unit 101. The user or designer of the machine tool system can therefore view the data displayed on display unit 101, so that the maximum output corresponding to the electric power consumption that may occur when the machine tool system is used can be grasped more accurately and easily and, as a consequence, the DC conversion unit that has the determined maximum output can be selected easily from a plurality of DC conversion units 11.1, 11.2. Display unit 101 may further display the input current values Im1(t), Im2(t), . . . , ImNmax(t) to motor units 2-1, 2-2 and 2-3, and the input voltage values Vm1(t), Vm2(t), . . . , VmNmax(t) to motor units 2-1, 2-2 and 2-3.

Figure 10:
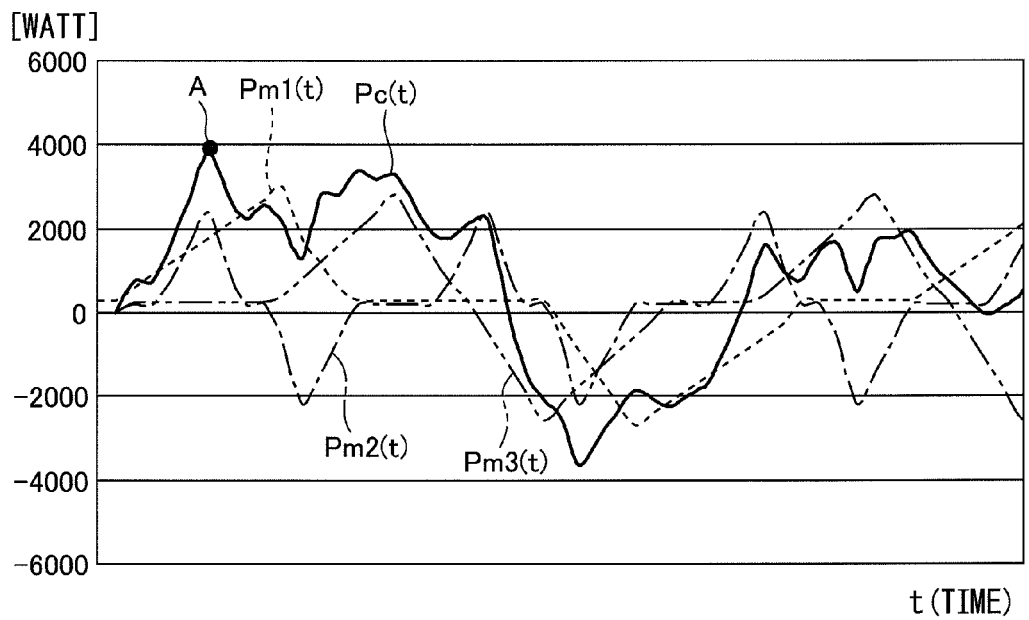
FIG. 10 is a diagram that illustrates electric power consumption of motor units and electric power consumption of a DC conversion unit for describing determination of a maximum output power consumption of DC conversion unit when a motor driving device according to a fourth embodiment of the present invention operates.
Figure 11:
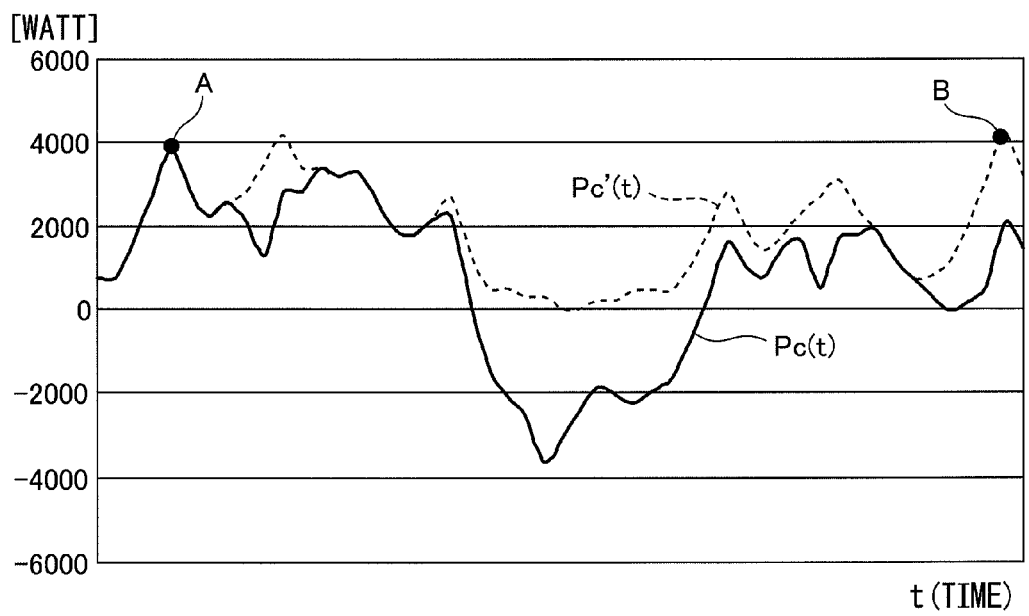
FIG. 11 is a diagram for describing determination of a maximum output power consumption of DC conversion unit with or without an effect of regenerative electric power when a motor driving device according to a fourth embodiment of the present invention operates.

FIGS. 10 and 11 are diagrams for describing determination of the maximum output of a DC conversion unit when a motor driving device according to a fourth embodiment of the present invention operates, wherein FIG. 10 illustrates electric power consumption of the motor units and electric power consumption of the DC conversion unit and FIG. 11 describes an effect of regenerative electric power.

FIG. 10 illustrates the time-series data of the electric power consumption values Pm1(t), Pm2(t) and Pm3(t) and the time-series data of the total electric power consumption Psum(t) of the motor units, as well as the time-series data of the electric power consumption value Pc(t) of the DC conversion unit and motor units that is calculated without consideration of the effect of regenerative electric power. Further, FIG. 11 illustrates the time-series data of the electric power consumption value Pc(t) of the DC conversion unit and motor units that is calculated without consideration of the effect of regenerative electric power and the time-series data of the electric power consumption value Pc'(t) of the DC conversion unit and motor units that is calculated with consideration of the effect of regenerative electric power. When the electric power consumption value Pc(t) of the DC conversion unit and motor units is calculated without consideration of the effect of regenerative electric power, the maximum output Pmax of the DC conversion unit is reached at point A. On the other hand, when the electric power consumption value Pc'(t) of the DC conversion unit and motor units is calculated with consideration of the effect of regenerative electric power as in the fourth embodiment of the present invention, the maximum output Pmax of the DC conversion unit is reached at point B. Comparing the maximum output value Pmax of the DC conversion unit at point A with that at point B in view of the effect of the regenerated electric power, around time B, motor unit 2-3 operates in a regenerating manner (FIG. 10), and therefor, the electric power consumption of motor unit 2-3 exhibits a negative value (or, in other words, a value less than 0 watt). As a result, according to the calculation by maximum output calculation unit 25 of the DC conversion unit, Pc'(t) exhibits the maximum value around point B that is larger than the maximum output Pmax of the DC conversion unit at point A when the regenerated electric power is not considered.

As described above, depending on combination of regenerating time periods of the motors, the maximum output Pmax of the DC conversion unit (point B) is larger than the maximum output Pmax of the DC conversion unit (point A) that is determined without consideration of the effect of the regenerated electric power. The user or designer of the machine tool system may therefore calculate the electric power consumption value Pc'(t) of the DC conversion unit in consideration of the effect of the regenerated electric power as in the fourth embodiment of the present invention, so that the maximum output of the DC conversion unit is determined can be determined based on the value that is calculated by subtracting the electric power consumption of the motor units that operate in a regenerating manner from the value calculated as the electric power consumption of the DC conversion unit, and the maximum output of the DC conversion unit corresponding to the electric power consumption that may occur in actual use can be determined more accurately and easily.

In a machine tool system having motor units for each driving axis of a machine tool, the present invention can be applied to a case in which the motor units are driven by a motor driving device having: a single DC conversion unit that converts input AC into DC; and a plurality of AC conversion units that converts DC output from the DC conversion unit into AC supplied to the motor units as driving electric power.

According to the present invention, in a motor driving device having: a single DC conversion unit that converts input AC into DC; and a plurality of AC conversion units that converts DC output from the DC conversion unit into AC supplied to the motor units as driving electric power, electric power consumption of the motor units, the AC conversion units and/or DC conversion unit under desired operating conditions or circumstances is calculated and, based on it, the maximum output of the DC conversion unit that is at least necessary to generate AC driving electric power to drive the motor units is calculated, so that the maximum output of the DC conversion unit corresponding to the electric power consumption that may occur in actual use can be determined more accurately and easily. As a result, according to the present invention, the DC conversion unit that is low in cost and occupies little space can be selected easily.

Conventionally, in a machine tool system having motor units for each driving axis and AC conversion units provided corresponding to the motor units, a single DC conversion unit supplies DC electric power to a plurality of AC conversion units, so that cost and space occupation of the motor driving device can be reduced in comparison with the motor driving device in which a plurality of DC conversion units are provided. In contrast to this, according to the present invention, the maximum output of the DC conversion unit corresponding to the electric power consumption that may occur in actual use can be determined more accurately and easily. As a result, cost and space occupation of the motor driving device can be further reduced.

In the first aspect of the present invention, the maximum value of the electric power consumption of the DC conversion unit of the motor driving device that operates under desired operating conditions or circumstances is calculated. In the second and third aspects of the present invention, the maximum value of the electric power consumption of the motor units of the motor driving device that operates under desired operating conditions or circumstances is calculated. In the fourth aspect of the present invention, the maximum value of the electric power consumption of the DC conversion unit and the motor units of the motor driving device that operates under desired operating conditions or circumstances is calculated and, based on the calculation result, the maximum output of the DC conversion unit is determined. The DC conversion unit suitable for the operating conditions or circumstances can be therefore selected easily.

What is claimed is:

1. A motor driving device comprising:
   a single DC conversion unit that converts input AC into DC;

a plurality of AC conversion units that convert DC output from said DC conversion unit into AC supplied to a plurality of motor units as driving electric power;

an electric power consumption calculation unit of the DC conversion unit that calculates electric power consumption of the DC conversion unit from input voltage and input current to said DC conversion unit under desired operating conditions or circumstances every predetermined time period; and a maximum output calculation unit of the DC conversion unit that extracts an eventual maximum value from said electric power consumption of the DC conversion unit calculated every said predetermined time period and outputs the extracted eventual maximum value as a maximum output of the DC conversion unit, wherein the single DC conversion unit is selected from among a plurality of DC conversion units by choosing one of the plurality of DC conversion units as the single conversion unit which outputs said maximum output of the DC conversion unit under said desired operating conditions or circumstances, wherein said maximum output calculation unit of the DC conversion unit corrects said calculated maximum output of the DC conversion unit by using correction parameters and outputs the corrected maximum output of the DC conversion unit such that the corrected maximum output of the DC conversion unit is larger than an actual maximum output by at least one of multiplication and addition.

2. A motor driving device according to claim 1, wherein said electric power consumption calculation unit of the DC conversion unit calculates said electric power consumption of the DC conversion unit by calculating an inner product of values for said input voltage and said input current in a vector space.

3. A motor driving device according to claim 1, wherein said electric power consumption calculation unit of the DC conversion unit corrects said calculated electric power consumption of the DC conversion unit by using correction parameters and outputs the corrected calculated electric power consumption of the DC conversion unit.

4. A motor driving device according to claim 1, further comprising a display unit that displays computation results or desired data that is being computed by said electric power consumption calculation unit of the DC conversion unit or said maximum output calculation unit of the DC conversion unit.

5. A motor driving device comprising:
a single DC conversion unit that converts input AC into DC;
a plurality of AC conversion units that convert DC output from said DC conversion unit into AC supplied to a plurality of motor units as driving electric power;
an electric power consumption calculation unit of the motor units that calculates electric power consumption of the motor units from voltage and current supplied to said motor units under desired operating conditions or circumstances every predetermined time period; and
a maximum output calculation unit of the DC conversion unit that calculates total electric power consumption of the motor units that is a summation of the electric power consumption values of all said motor units every said predetermined time period and extracts an eventual maximum value from said total electric power consumption of the motor units calculated every said predetermined time period and outputs the extracted eventual maximum value as a maximum output of the DC conversion unit;

wherein the single DC conversion unit is selected from among a plurality of DC conversion units by choosing one of the plurality of DC conversion units as the single conversion unit which outputs said maximum output of the DC conversion unit under said desired operating conditions or circumstances, wherein said maximum output calculation unit of the DC conversion unit corrects said calculated maximum output of the DC conversion unit by using correction parameters and outputs the corrected maximum output of the DC conversion unit such that the corrected maximum output of the DC conversion unit is larger than an actual maximum output by at least one of multiplication and addition.

6. A motor driving device according to claim 5, wherein said maximum output calculation unit of the DC conversion unit calculates total electric power consumption of the motor units every said predetermined time period and extracts a maximum value from the total electric power consumption of all the motor units calculated every said predetermined time period and outputs the extracted maximum value as a maximum output of the DC conversion unit,
wherein the total electric power consumption of the motor units is calculated by summing only fractions of the electric power consumption of said motor units actually flowing into said motor units.

7. A motor driving device according to claim 6, wherein said motor driving device further comprises an electric power consumption calculation unit of the DC conversion unit that calculates electric power consumption of the DC conversion unit from the input voltage and input current to said DC conversion unit every predetermined time period,
wherein said maximum output calculation unit of the DC conversion unit that calculates a value that is obtained by adding an absolute value of a fraction of said electric power consumption of the motor units flowing out from said motor units to said electric power consumption of the DC conversion unit every said predetermined time period and extracts a maximum value from the values calculated every said predetermined time period and outputs the extracted maximum value as a maximum output of the DC conversion unit.

8. A motor driving device according to claim 7, wherein said electric power consumption calculation unit of the DC conversion unit calculates said electric power consumption of the DC conversion unit by calculating an inner product of values for said input voltage and said input current in a vector space.

9. A motor driving device according to claim 5, wherein said electric power consumption calculation unit of the motor units calculates said electric power consumption of the motor units by calculating an inner product of values for the voltage and current supplied to the motor units in a vector space.

10. A motor driving device according to claim 5, wherein said electric power consumption calculation unit of the motor units calculates said electric power consumption of the motor units by summing a value that is obtained by multiplying detected velocity and torque of said motor units and a value that is obtained by multiplying a square of the input current value supplied to said motor units and an internal resistance value of said motor units.

11. A motor driving device according to claim 7, wherein said electric power consumption calculation unit of the DC conversion unit corrects said calculated electric power consumption of the DC conversion unit by using correction parameters and outputs the corrected calculated electric power consumption of the DC conversion unit.

12. A motor driving device according to claim 5, wherein said electric power consumption calculation unit of the motor units corrects said calculated electric power consumption of the motor units by using correction parameters and outputs the corrected calculated electric power consumption of the motor units.

13. A motor driving device according to claim 7, further comprising a display unit that displays computation results or desired data that is being computed by said electric power consumption calculation unit of the DC conversion unit, said maximum output calculation unit of the DC conversion unit or said electric power consumption calculation unit of the motor unit.

* * * * *